(12) United States Patent
Simard-Bergeron

(10) Patent No.: US 11,592,103 B2
(45) Date of Patent: Feb. 28, 2023

(54) COMPLIANT JOURNAL BEARING SHAFT ASSEMBLY

(71) Applicant: PRATT & WHITNEY CANADA CORP., Longueuil (CA)

(72) Inventor: Julien Simard-Bergeron, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 465 days.

(21) Appl. No.: 16/777,045

(22) Filed: Jan. 30, 2020

(65) Prior Publication Data

US 2021/0239013 A1    Aug. 5, 2021

(51) Int. Cl.
*F16H 57/08*     (2006.01)
*F16H 57/04*     (2010.01)
*F02C 7/36*      (2006.01)

(52) U.S. Cl.
CPC ....... *F16H 57/082* (2013.01); *F16H 57/0479* (2013.01); *F16H 57/0486* (2013.01); *F02C 7/36* (2013.01); *F16H 2057/085* (2013.01)

(58) Field of Classification Search
CPC ...... F02C 7/36; F16H 57/082; F16H 57/0479; F16C 2360/23

USPC .......................................................... 475/331
See application file for complete search history.

(56) References Cited

U.S. PATENT DOCUMENTS

| | | | |
|---|---|---|---|
| 5,102,379 A * | 4/1992 | Pagluica | F16H 57/082 475/159 |
| 8,398,517 B2 | 3/2013 | McCune | |
| 10,240,671 B2 | 3/2019 | Muldoon | |
| 10,519,871 B2 * | 12/2019 | Desjardins | F01D 25/162 |
| 2019/0048802 A1 | 2/2019 | Desjardins | |

* cited by examiner

*Primary Examiner* — Erin D Bishop
(74) *Attorney, Agent, or Firm* — Norton Rose Fulbright Canada LLP

(57) ABSTRACT

A carrier assembly has a pair of axially spaced-apart plates defining an axial gap therebetween. The plates have a plurality of planetary bores on a plurality of planetary axes. A plurality of planetary gear mount assemblies are disposed on the planetary axes and mounted within the planetary bores of the gear carrier. Each assembly comprises a journal bearing shaft having a pair of compliance grooves extending axially from opposed axial ends of the shaft. An inner cylindrical surface of each compliance groove defines a shaft mounting surface. A pair of collars is provided to assemble each journal bearing shaft to the carrier. Each collar has a mounting socket mating the shaft mounting surface and an external collar surface matching the planetary bore diameter.

18 Claims, 10 Drawing Sheets

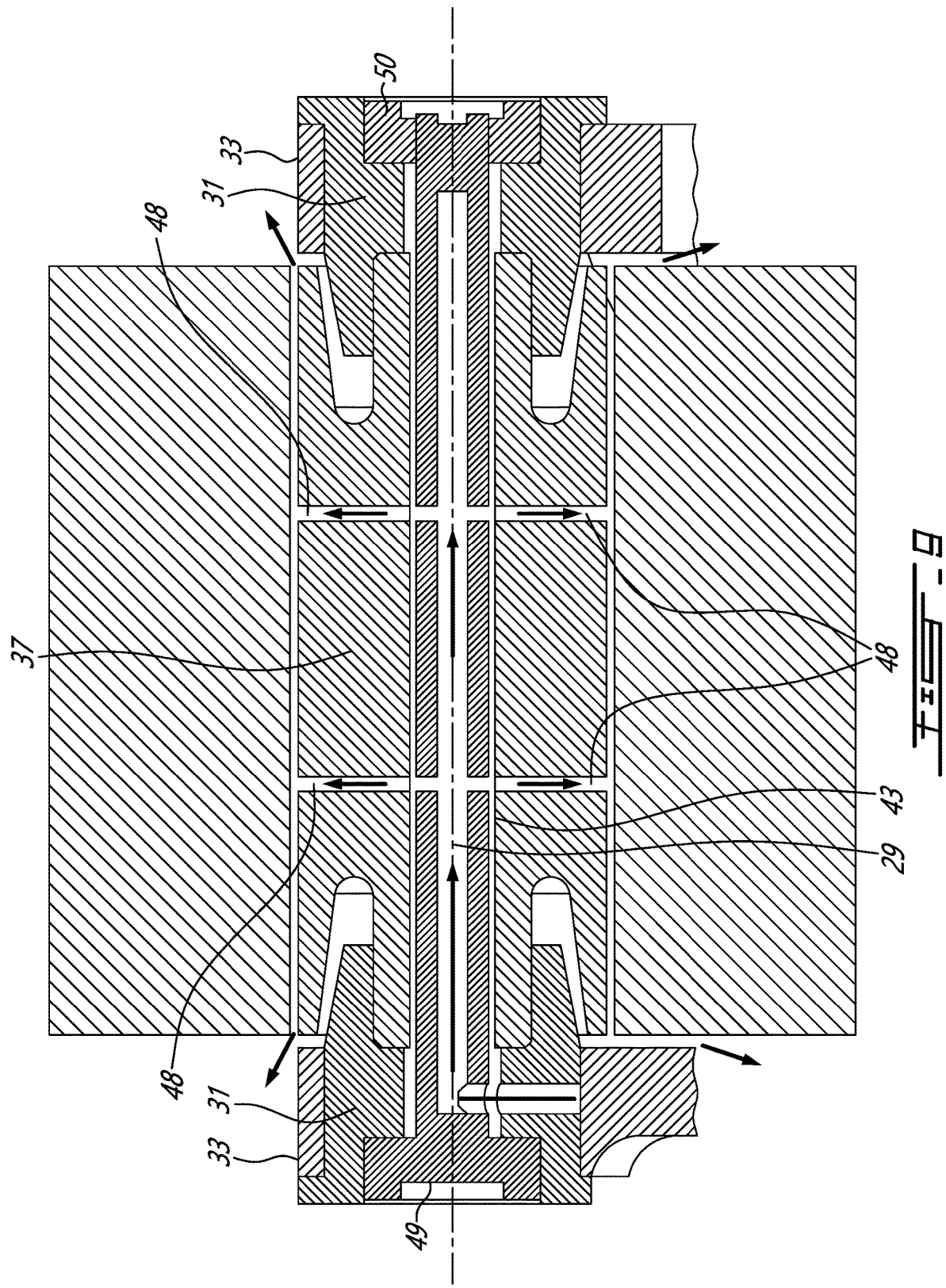

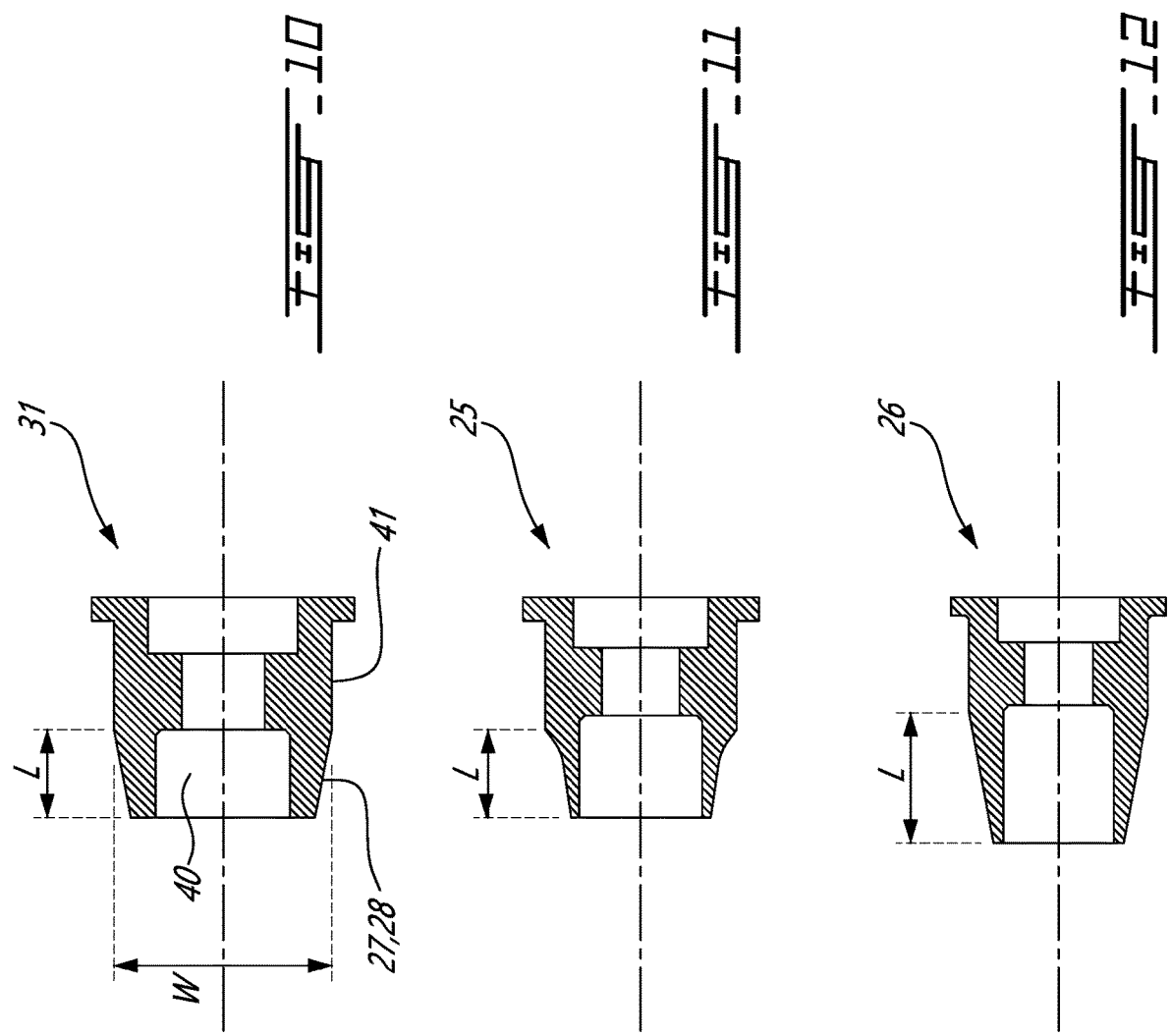

COMPLIANT JOURNAL BEARING SHAFT ASSEMBLY

TECHNICAL FIELD

The disclosure relates generally to a planetary gear assembly suitable for a gas turbine engine and, more particularly, to a compliant journal bearing shaft assembly.

BACKGROUND

A planetary gear train may comprise an input shaft with a sun gear, an orbiting array of planetary gears engaging the sun gear and mounted in a planetary gear carrier, a stationary ring gear engaging the planetary gears, and an output shaft mounted to the planetary gear carrier. The input rotational speed (of the input shaft and sun gear) is reduced to an output rotational speed (of the planetary gear carrier and output shaft) according to the intermeshed gear ratios.

The planetary gear carrier has axially drilled bores and flat machined surfaces to mount journal bearing shafts on which multiple planetary gears rotate. Torque load is transmitted, from the input shaft and sun gear via the journal bearing shafts and the planetary gears, to the planetary gear carrier and output shaft. Accordingly, the journal bearing shafts are subjected to significant shear stress while transmitting the torque load.

Improvement is desirable.

SUMMARY

The disclosure describes a carrier assembly comprising: a gear carrier having a central axis and a pair of axially spaced-apart plates, the pair of axially spaced-apart plates having inward surfaces that are axially spaced apart to define an axial gap, the pair of axially spaced-part plates having a plurality of planetary bores on a plurality of planetary axes parallel to and radially outward from the central axis, the planetary bores having a planetary bore diameter; a plurality of shaft assemblies disposed on the planetary axes and mounted within the planetary bores of the gear carrier; wherein each shaft assembly includes: a journal bearing shaft mounted in the axial gap and having a pair of compliance grooves extending axially from opposed axial ends of the shaft, an inner cylindrical surface of each compliance groove defining a shaft mounting surface; and a pair of collars, each collar having a mounting socket mating the shaft mounting surface and an external collar surface matching the planetary bore diameter.

In accordance with another aspect, there is provided a shaft assembly comprising: a journal bearing shaft extending axially along a planetary axis of a planetary gear, the journal bearing shaft having: an axial length configured to be inserted into an axial gap between a pair of axially spaced-part plates of a gear carrier; an external cylindrical surface having a shaft diameter greater than a planetary bore diameter of a planetary bore defined in the pair of axially spaced-part plates of the gear carrier, the external cylindrical surface being configured to rotatably mount the planetary gear; and a pair of compliance grooves extending axially from opposed axial end of the journal bearing shaft, an inner cylindrical surface of each compliance groove defining a shaft mounting surface; and a pair of collars, each collar having a mounting socket mating the shaft mounting surface and an external collar surface configured to mate with the planetary bore diameter of the planetary bore.

In a still further aspect the disclosure describes A method of assembling a plurality of journal bearing shafts to a planetary gear carrier having a pair of axially spaced-apart plates defining an axial gap therebetween, the pair of axially spaced-apart plates having a plurality of planetary bores on a plurality of planetary axes; the method comprising: disposing a journal bearing shaft into the axial gap between the axially spaced-apart plates of the planetary gear carrier, the journal bearing shaft having compliance grooves extending axially from opposed ends thereof, an inner surface of each compliance groove defining a shaft mounting surface; aligning a shaft axis of the journal bearing shaft with an associated one of the planetary axes; inserting a pair of collars into the planetary bores at the opposed ends of the journal bearing shaft; and mounting a mounting socket of each collar on the shaft mounting surface of the journal bearing shaft.

Embodiments can include combinations of the above features.

DESCRIPTION OF THE DRAWINGS

FIG. 9 is an axial sectional view showing an alternative assembly using an elongate bolt and nut, replacing the two end bolts of FIG. 8.

FIG. 10 shows a detail axial section view through the collar of FIGS. 5-9 with a conical profile on the inward mounting end.

FIG. 11 shows an alternative collar where the width dimension W of the inward mounting end has been reduced or tapered to increase compliance or flexibility under loading.

FIG. 12 shows a further alternative collar where the length dimension L of the inward mounting end has been increased or stretched to decrease compliance or flexibility under loading.

DETAILED DESCRIPTION

Figure 1:
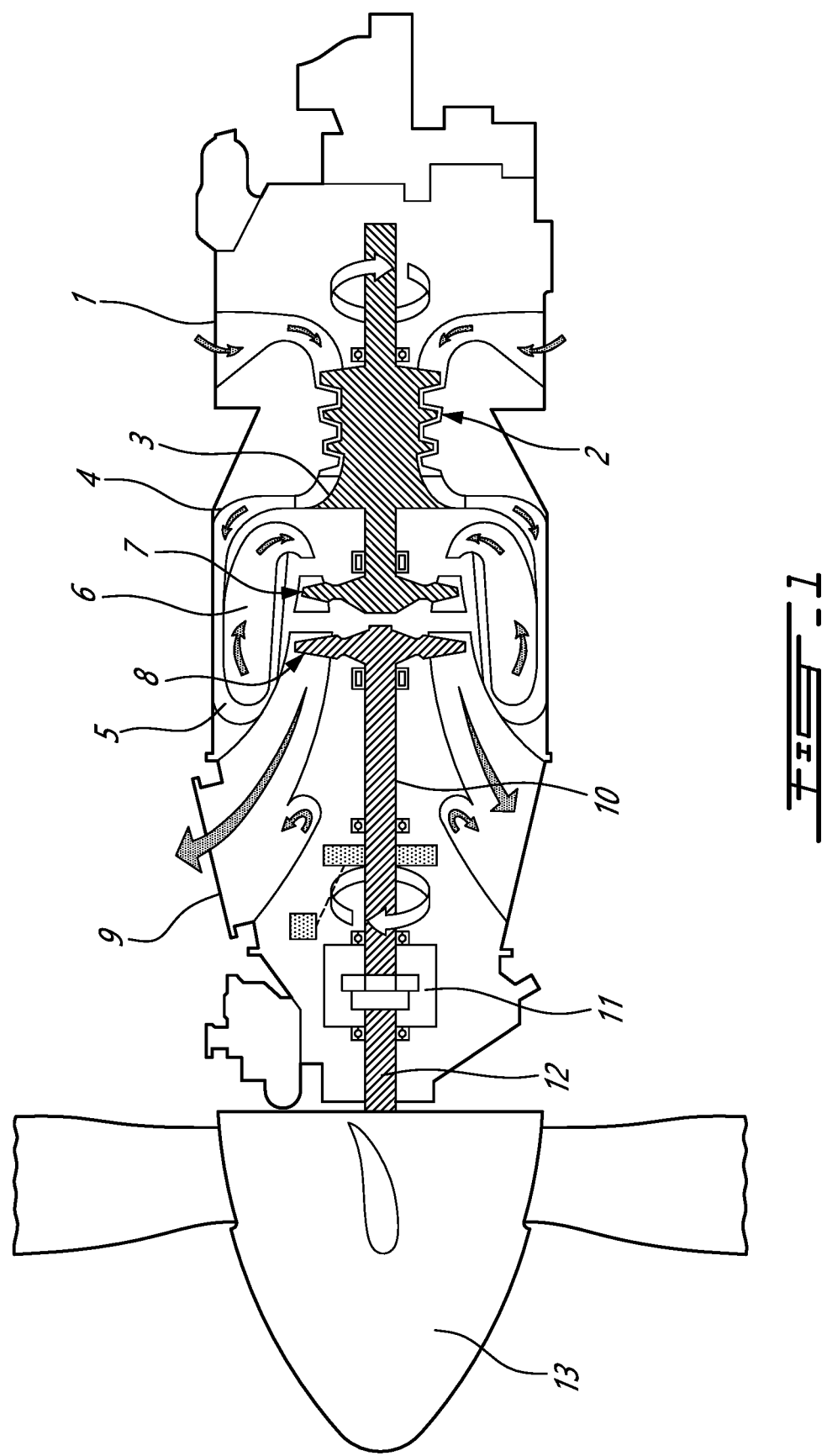
FIG. 1 shows an axial cross-section view of an example turbo-shaft gas turbine engine.

FIG. 1 shows an axial cross-section through an example turbo-shaft gas turbine engine. The air intake 1 draws air into the engine to pass through the low-pressure axial compressor 2 and high-pressure centrifugal compressor 3. Compressed air exits the HP compressor 3 through a diffuser 4 and is contained within a plenum 5 that surrounds the combustor 6. Fuel is supplied to the combustor 6 and is mixed with air from the compressor 3 when sprayed through nozzles into the combustor 6 as a fuel air mixture that is ignited. The hot gases from the combustor 6 pass over the high pressure turbine 7 and low pressure turbine 8 before exiting the exhaust duct 9 of the engine.

The low pressure engine shaft 10 provides an input rotational speed to the reduction gear box 11. A reduced output rotational speed is imparted to the propeller shaft 12 which drives the propeller 13.

Figure 2:
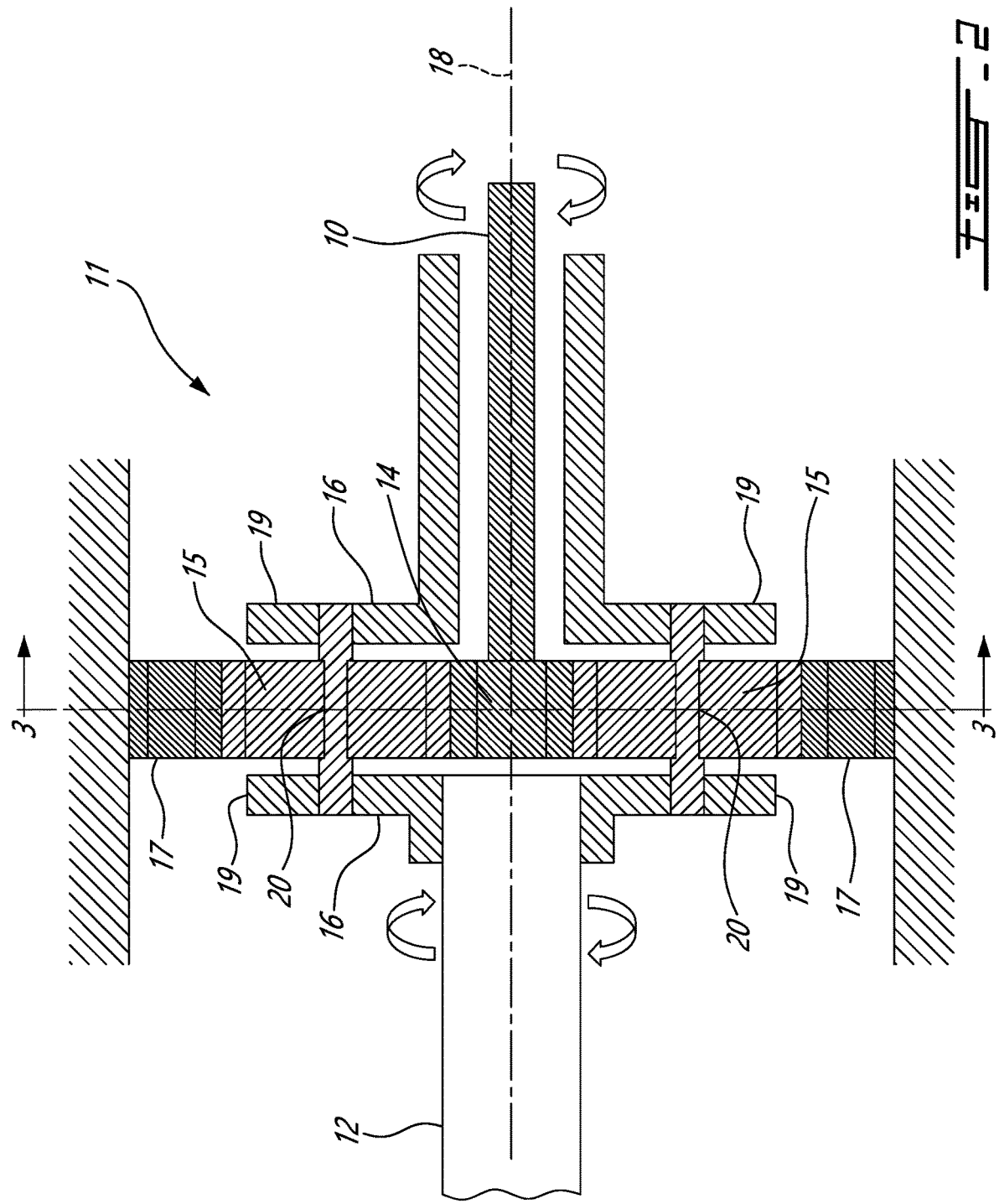
FIG. 2 shows a schematic axial cross-section through the gears and gear carrier of a planetary gear train that is housed within the reduction gear box of the engine shown in FIG. 1.
Figure 3:
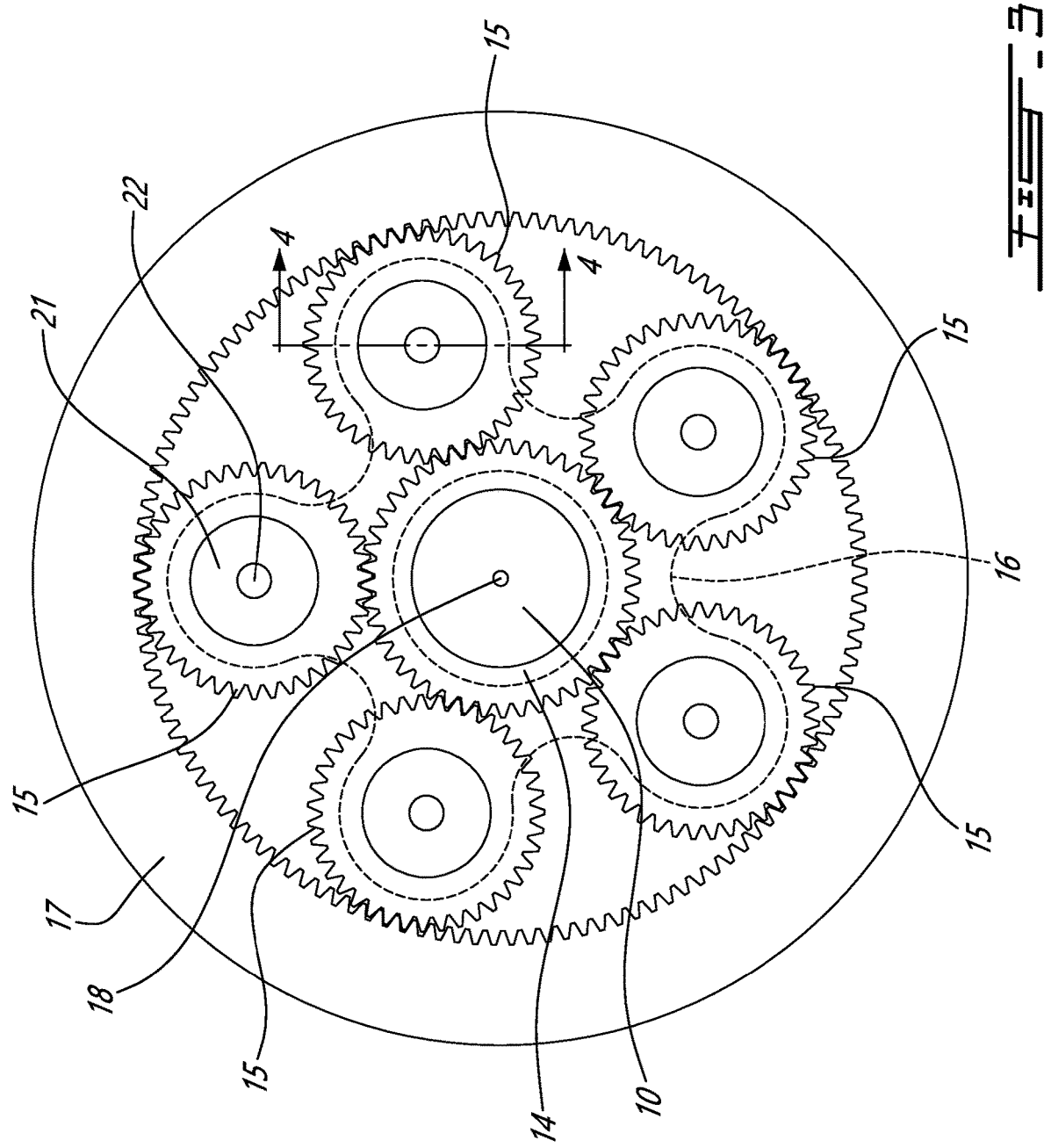
FIG. 3 is a radial cross-section view along line 3-3 of FIG. 2, showing the central sun gear, five planetary gears and stationary ring gear.

FIGS. 2 and 3 represent a schematic axial cross-section and radial cross-section showing a planetary gear train housed in the reduction gear box 11 of FIG. 1. The low pressure engine shaft 10 rotates a central sun gear 14 at a relatively high speed. The central sun gear 14 engages with multiple planetary gears 15 that are mounted in a planetary gear carrier 16. FIG. 3 shows the planetary gear carrier 16 in dashed outline and carries five planetary gears 15 as an example. The planetary gears 15 engage a stationary ring gear 17 which results in rotation of the planetary gear carrier 16 and the propeller shaft 12 secured to the carrier 16 at a reduced relatively low speed.

Figure 4:
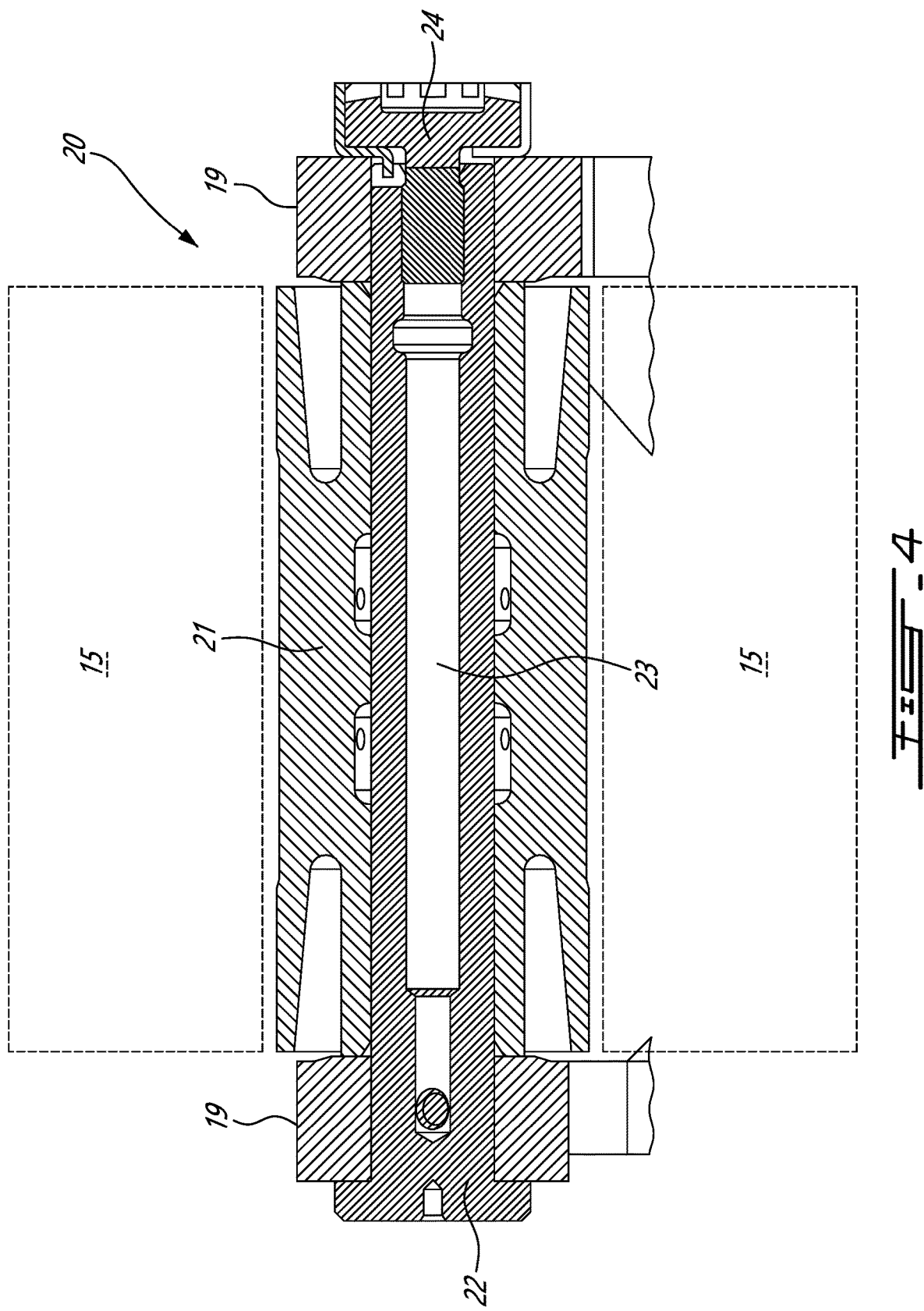
FIG. 4 is an axial sectional view along line 4-4 of FIG. 3 showing the journal bearing shaft with the planetary gear, and a central axial bolt securing the journal bearing shaft between the radial plates of the gear carrier.

As shown in FIGS. 2 and 3, the planetary gear carrier 16 has a central axis 18 and a pair of axially spaced-apart plates 19 disposed on opposed sides of the planetary gears 15. The planetary gears 15 are supported on a shaft assembly 20 mounted at both axial ends to the plates 19 of the planetary gear carrier 16. FIG. 4 shows an axial sectional view along line 4-4 of FIG. 3 showing a first example of a shaft assembly 20. FIGS. 5-12 show other examples of a shaft assembly 30 in accordance with some aspect of the present disclosure.

Referring to FIG. 4, a single part planetary gear carrier 16 has a pair of axially spaced-apart plates 19 manufactured from a metal casting with axially spaced apart disc-like plates 19 and connecting arms. The planetary gear 15 is mounted to a journal bearing shaft 21 and is inserted radially between the plates 19. A bolt 22 is axially inserted through axially drilled bores in the plates 19 and through a central bore in the journal bearing shaft 21. A secondary bolt 24 engages the central oil distribution passage 23 at the distal end (right as drawn) of the bolt 22. It can be appreciated from FIG. 4 that the journal bearing shaft 21 has undercut grooves at opposed axial ends thereof to provide resilient compliance for accommodating alignment tolerances, deflection under load and dampening transmission of variable forces on the gear teeth. The journal bearing shaft 21 and planetary gear 15 are assembled together and then inserted radially between the spaced apart disc-like support plates 19 of the single part planetary gear carrier. The journal bearing shaft 21 is then secured to the carrier using axial pin or bolt 22. The hollow profile and transmission of torque through the axial bolt can result in high stresses within the bolt.

Figure 5:
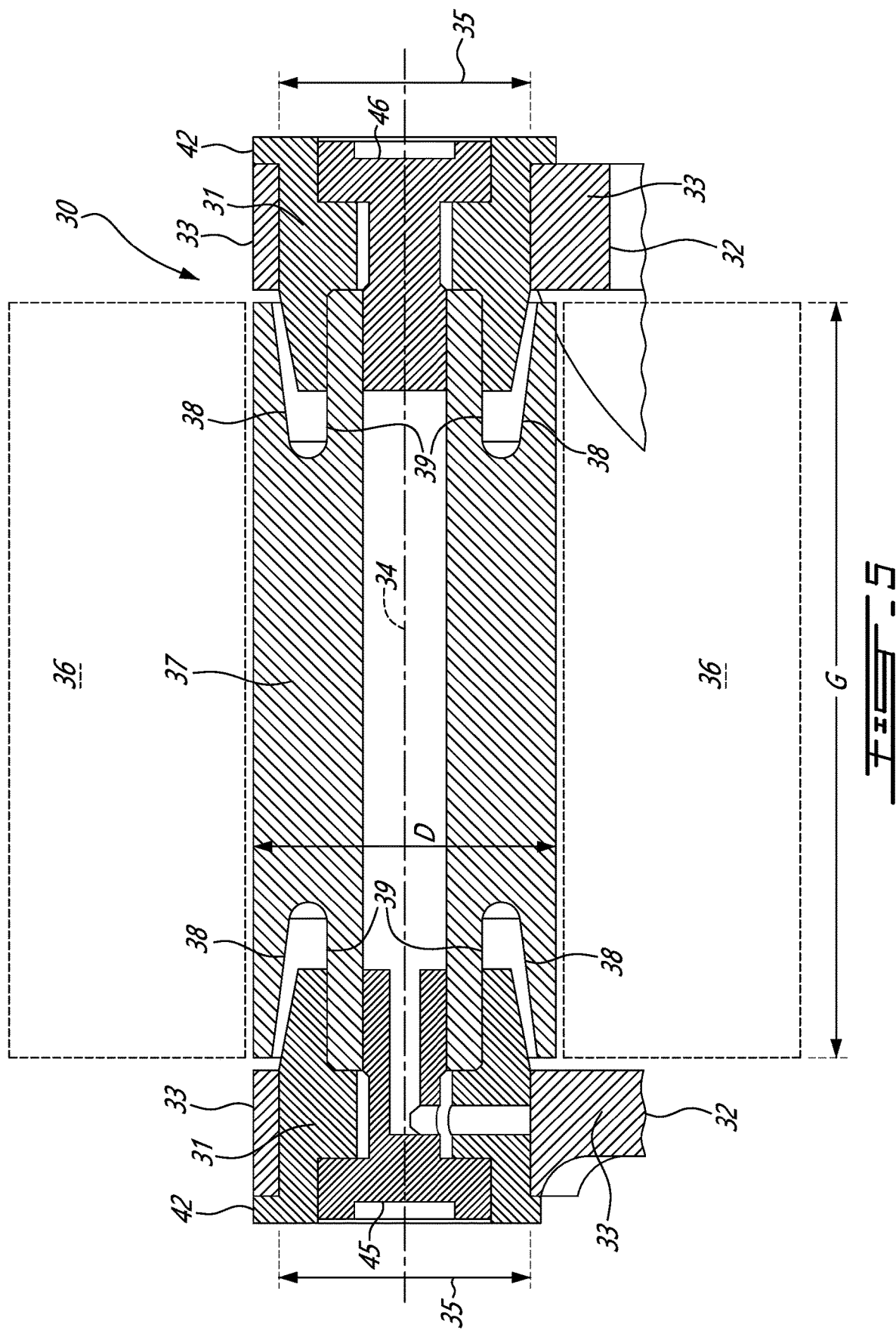
FIG. 5 is an axial sectional view in accordance with the present description showing a journal bearing shaft with axial ends mounted in annular collars to secure the journal bearing shaft spanning between the radial plates of the gear carrier.
Figure 6:
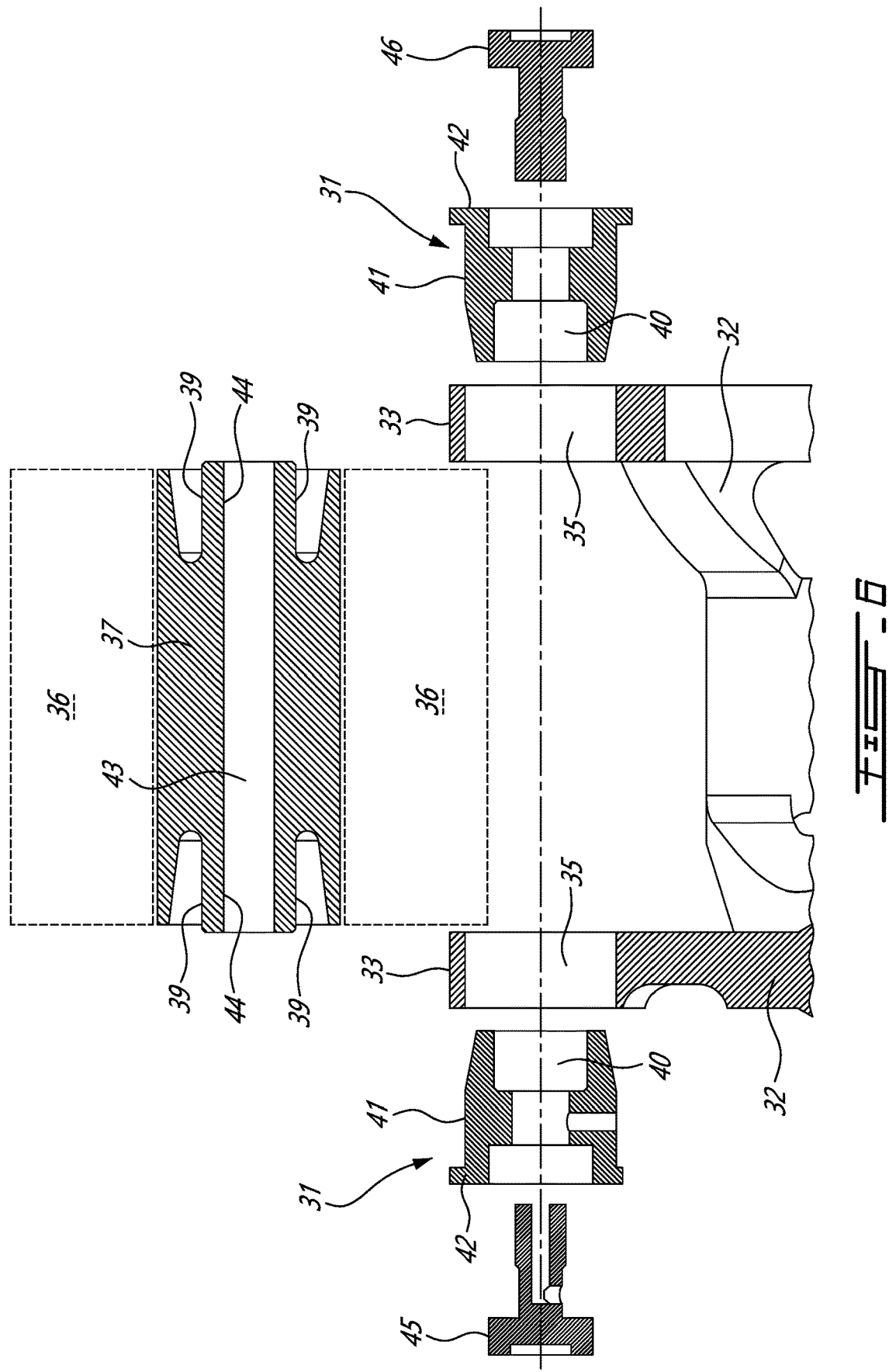
FIGS. 6 and 7 are exploded axial section views showing the progressive assembly of the journal bearing shaft, collars, and bolts to the single piece planetary gear carrier to produce the assembly shown in FIG. 5.
Figure 7:
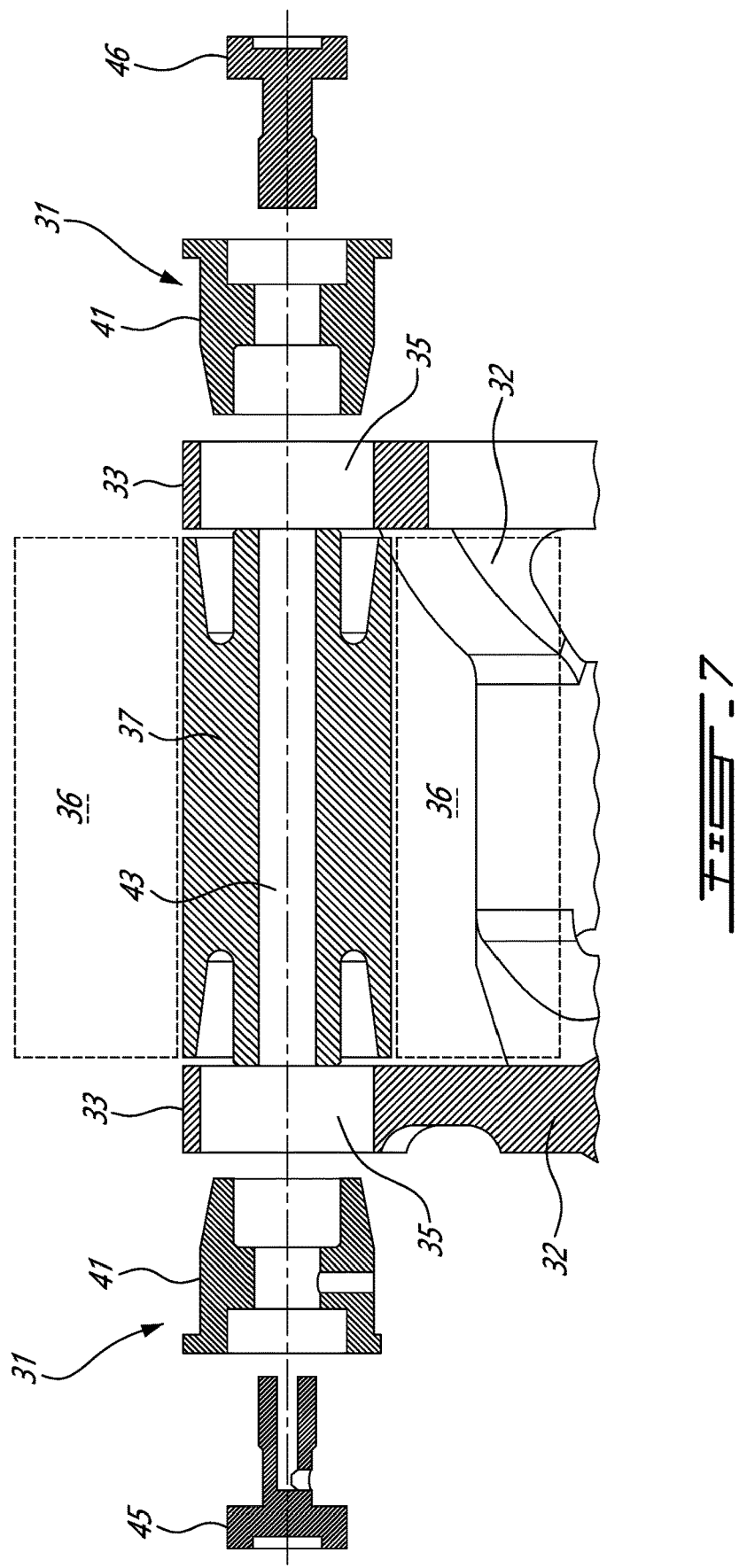

Referring to FIGS. 5-7 a shaft assembly 30 including collars 31 in accordance with one aspect of the present disclosure will be described. According to this example, the planetary gear carrier 32 is manufactured as a single casting with two parallel plates 33. The plates 33 have opposed axially facing surfaces that are axially spaced apart to define an axial gap shown as dimension "G". The plates 33 have a planetary axis 34 and a planetary bore 35 there through. In the example of FIG. 3, there are five planetary axes 34 and planetary bores 35, though any number could be selected.

The planetary axes 34 are parallel to and radially outward from the central rotational axis of the carrier 32.

As shown in FIGS. 5-7, a planetary gear 36 is mounted on a concentric journal bearing shaft 37 symmetric about the planetary axis 34. The journal bearing shaft 37 has an axial length less than the axial gap G between the pair of plates 33 of the gear carrier 32. The external cylindrical surface of the journal bearing shaft 37 has a shaft diameter D greater than the diameter of the planetary bore 35. The external cylindrical surface rotatably mounts the planetary gear 36 with a narrow gap that is filled with oil under pressure in operation as described below in relation to FIG. 8. A pair of annular compliance grooves 38 extends axially from the axial ends of the journal bearing shaft 37. An inner cylindrical surface 39 of each compliance groove 38 defines a shaft mounting surface to engage the collars 31.

As best seen in FIGS. 6-7, each collar 31 has a mounting socket 40 mating the inner cylindrical surface 39 for mounting the shaft 37 in an interference fit. Each collar 31 has an external cylindrical collar surface 41 matching the diameter of the planetary bore 35 of carrier 32 with an interference fit. The collars 31 have an axial restraint flange 42 for abutting the outer surface of the axially spaced-apart plates 33 of the gear carrier 32.

Still referring to FIGS. 5-7, each journal bearing shaft 37 can have an internal shaft bore 43 for distributing lubricating oil. In the example shown, the internal shaft bore 43 can have an internally threaded axial end 44. A pair of bolts 45, 46 with externally threaded shanks engages the internally threaded axial end 44 of the internal shaft bore 43 to secure the journal bearing shaft 37 and collars 31 to the plates 33 of the single piece planetary gear carrier 32.

Figure 8:
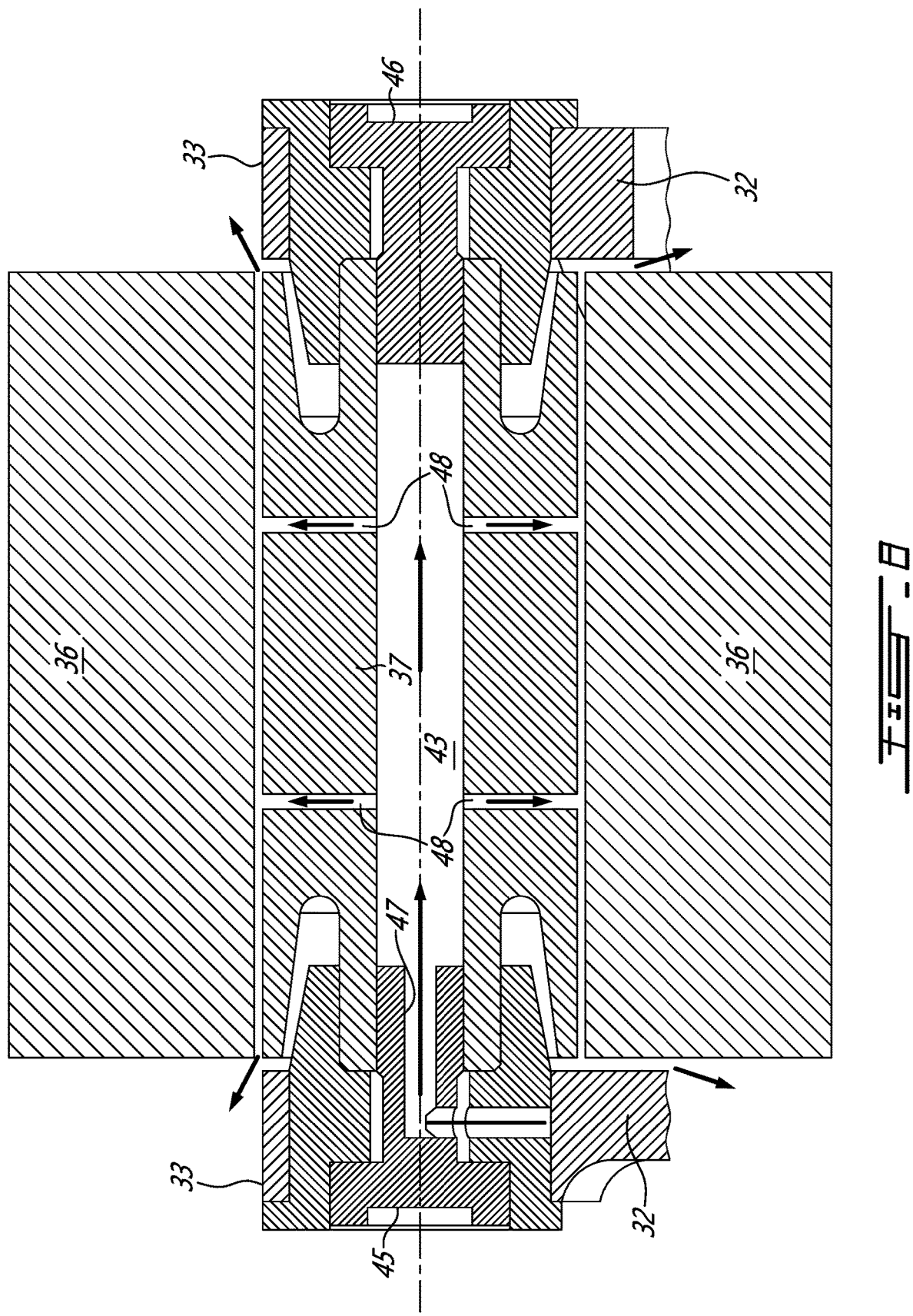
FIG. 8 is an axial sectional view showing the flow of lubricating oil indicated with arrows.

As seen in FIG. 8, at least one of the pair of bolts 45, 46 includes an oil passage 47 in communication with a source of oil SO within the gear carrier 32. Lubricating oil under pressure flows from the gear carrier 32, through the oil passage 47 and into the internal shaft bore 43 as indicated with arrows. Oil is distributed from the internal shaft bore 43 to the annular lubricating gap between the journal bearing shaft 37 and the planetary gear 36 through oil distribution channels 48. The oil distribution channels 48 convey oil from the internal shaft bore 43 to the external cylindrical surface of the journal bearing shaft 37. Oil escaping from the annular lubricating gap is scavenged within the reduction gear box and is recycled through the engine oil filtration and recirculation system.

FIG. 9 shows an alternative assembly using an elongate bolt 49 and nut 50 instead of the two end bolts 45, 46 of FIG. 8. The elongate bolt 49 passes through the internal shaft bore 43 of the journal bearing shaft 37 and is secured to a nut 50 for engaging each pair of collars 31. As indicated with arrows in FIG. 9, the bolt 49 can include an oil passage 29 in communication with a source of oil within the gear carrier 32. The elongate bolt 49, nut 50 and short bolts 45, 46 can include a head countersunk within an outer end of an associated collar 31.

FIG. 10 shows an exemplary collar 31 in isolation of the same proportions as the collars 31 in the example of FIGS. 5-9. The compliance grooves 38 in the journal bearing shaft 37 provide a degree of resilient compliance to accommodate tolerances, alignment issues and dampening transmission of variable forces on the gear teeth of the planetary gears 36. The mounting socket 40 is surrounded by an annular inward end 27 having an axial length L. The radial width W is transverse to the length L and varies linearly to define a frusto-conical surface 28 in the example shown. The collar 31 is restrained on the external cylindrical collar surface 41 by an interference fit within the planetary bore 35 (see FIGS. 6-7). However, the annular inward end 27 can flex elastically under load in a cantilever manner.

FIGS. 11-12 show alternative collars 25, 26 to modify their resilient compliance. In FIG. 11, the width dimension W is reduced or tapered to increase deflection or compliance under loading. The width dimension W could also be increased if less resilient compliance is desired. In FIG. 12, the length dimension L is increased to modify elastic compliance under loading, however the length L could equally be reduced to modify compliance. Further modifications could include machining axial grooves on the frustoconical surface 28 to reduce flexural resistance of the annular inward end 27 and further modify compliant performance of the collar 31.

With reference to FIGS. 5-7, the present description provides a method of assembling a one piece planetary gear carrier 32, planetary gears 36, the associated journal bearing shafts 37 and collars 31 as follows.

The journal bearing shaft 37 with planetary gear 36 is inserted radially into the axial gap G defined between the axially spaced-apart plates 33 of the one piece planetary gear carrier 32. The journal bearing shaft 37 has an axial length marginally less than the axial gap G between the pair of axially spaced-apart plates 33 and has an external cylindrical surface having a shaft diameter D greater than the planetary bore diameter 35. Accordingly the journal bearing shaft 37 can have a large diameter D and need not pass axially through the planetary bore diameter 35. A pair of compliance grooves 38 extends axially from each axial end of the shaft 37 and an inner cylindrical surface 39 of each compliance groove 38 defines a shaft mounting surface to engage the mounting socket 40 of the collars 31.

The journal bearing shaft 37 is aligned with the associated planetary axis 34 and a pair of collars 31 are inserted into the planetary bores 35 at each axial end of the journal bearing shaft 37. The two end shaft mounting surfaces 39 of the journal bearing shaft 37 are mounted in the mounting sockets 40 of each collar 31 with an interference fit.

In the example shown, the axial restraint flange 42 of each collar 31 abuts the outer surface of the axially extending plates 33 of the gear carrier 32. A pair of bolts 45, 46 has externally threaded shanks that are screwed into engagement with a pair of internally threaded axial ends 44 of the internal shaft bore 43 of the journal bearing shaft 37. Alternatively, as shown in FIG. 9, a single elongate bolt could be used instead of a pair of bolts.

As shown in FIGS. 8-9 with arrows, oil can be conveyed from a source of oil such as an oil pump to a supply passage within the plates 33 of the gear carrier 32 to an oil passage 47, 29 in at least one of the bolts 45, 46, 49. Oil is further conveyed from the internal shaft bore 43 via oil distribution channels 48 to the external cylindrical surface of the journal bearing shaft 37.

At least some of the features of the above described embodiments and various combinations of features allow to reduce stresses on the journal bearing shafts, increase compliance and/or ease assembly of planetary gears onto a one piece or single part carrier.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the collars can have threaded connection to the journal bearing shaft or can be interference fitted, the pair of bolts used to mount the collars and journal bearing shaft together can be replaced with an elongate bolt and nut. Yet further modifications could be implemented by a person of ordinary skill in the art in view of the present disclosure, which modifications would be within the scope of the present technology.

What is claimed is:

1. A carrier assembly comprising:
    a gear carrier having a central axis and a pair of axially spaced-apart plates, the pair of axially spaced-apart plates having inward surfaces that are axially spaced apart to define an axial gap, the pair of axially spaced-part plates having a plurality of planetary bores on a plurality of planetary axes parallel to and radially outward from the central axis, each of the planetary bores having a planetary bore diameter;
    a plurality of shaft assemblies disposed on the planetary axes and mounted within the planetary bores of the gear carrier;
    wherein each shaft assembly includes:
        a journal bearing shaft mounted in the axial gap and having a pair of compliance grooves extending axially from opposed axial ends of the shaft, an inner cylindrical surface of each compliance groove defining a shaft mounting surface; and
        a pair of collars, each collar having a mounting socket mating the respective shaft mounting surface and an external collar surface matching the planetary bore diameter.

2. The carrier assembly according to claim 1, wherein each collar of the pair of collars has an axial restraint flange for abutting an outer surface of the respective axially-spaced apart plate of the gear carrier.

3. The carrier assembly according to claim 2, wherein:
    the journal bearing shaft has an internal shaft bore with internally threaded axial ends; and wherein
    each shaft assembly has a pair of bolts with externally threaded shanks engaging the internally threaded axial ends of the internal shaft bore.

4. The carrier assembly according to claim 3, wherein at least one bolt of the pair of bolts includes an oil passage in communication with a source of oil within the gear carrier.

5. The carrier assembly according to claim 4, wherein the journal bearing shaft includes oil distribution channels communicating between the internal shaft bore and an external cylindrical surface of the journal bearing shaft.

6. The carrier assembly according to claim 2, wherein:
    each journal bearing shaft has an internal shaft bore; and
    each shaft assembly comprises a bolt and nut engaging each pair of collars, each of the bolts extending through the internal shaft bore.

7. The carrier assembly according to claim 6, wherein each of the bolts includes an oil passage in communication with a source of oil within the gear carrier.

8. The carrier assembly according to any one of claims 3, wherein at least one bolt of the pair of bolts includes a head countersunk within an outer end of an associated collar.

9. A shaft assembly comprising:
    a journal bearing shaft extending axially along a planetary axis of a planetary gear, the journal bearing shaft having: an axial length configured to be inserted into an axial gap between a pair of axially spaced-part plates of a gear carrier; an external cylindrical surface having a shaft diameter greater than a planetary bore diameter of a planetary bore defined in the pair of axially spaced-part plates of the gear carrier, the external cylindrical surface being configured to rotatably mount the planetary gear; and a pair of compliance grooves extending axially from opposed axial end of the journal bearing shaft, an inner cylindrical surface of each compliance groove defining a shaft mounting surface; and a pair of collars, each collar having a mounting socket mating the respective shaft mounting surface and an external collar surface configured to mate with the planetary bore diameter of the planetary bore.

10. The shaft assembly according to claim 9, wherein each collar of the pair of collars has an axial restraint flange for abutting an outer surface of the respective axially spaced-apart plate of the gear carrier.

11. The shaft assembly according to claim 10, wherein:
the journal bearing shaft has an internal shaft bore with internally threaded axial ends; and
a pair of bolts with externally threaded shanks engaging the internally threaded axial ends of the internal shaft bore.

12. The shaft assembly according to claim 11, wherein at least one bolt of the pair of bolts includes an oil passage adapted for communication with a source of oil within the gear carrier.

13. The shaft assembly according to claim 12, wherein the journal bearing shaft includes oil distribution channels communicating between the internal shaft bore and the external cylindrical surface.

14. A method of assembling a journal bearing shaft to a planetary gear carrier having a pair of axially spaced-apart plates defining an axial gap therebetween, the pair of axially spaced-apart plates having a plurality of planetary bores on a plurality of planetary axes; the method comprising:
disposing the journal bearing shaft into the axial gap between the axially spaced-apart plates of the planetary gear carrier, the journal bearing shaft having compliance grooves extending axially from opposed ends thereof, an inner surface of each compliance groove defining a shaft mounting surface;
aligning a shaft axis of the journal bearing shaft with an associated one of the planetary axes;
inserting a pair of collars into the planetary bores at the opposed ends of the journal bearing shaft; and
mounting a mounting socket of each collar on the respective shaft mounting surface of the journal bearing shaft.

15. The method according to claim 14, comprising:
abutting an axial restraint flange of each collar to an outer surface of the respective axially spaced-apart plate of the gear carrier; and
connecting a pair of bolts with externally threaded shanks into engagement with a pair of internally threaded axial ends of an internal shaft bore of the journal bearing shaft.

16. The method according to claim 15, wherein the method comprises conveying oil from a source of oil within the gear carrier to an oil passage in at least one of the pair of bolts.

17. The method according to claim 16, wherein the method comprises conveying oil from the internal shaft bore via oil distribution channels to an external cylindrical surface of the journal bearing shaft.

18. The method according to claim 14, wherein the method comprises:
abutting an axial restraint flange of each collar to an outer surface of the respective axially-spaced apart plate of the gear carrier; and
connecting a bolt and nut to each collar of the pair of collars, the bolt extending through an internal shaft bore of the journal bearing shaft to compress the pair of collars against each axial end of the journal bearing shaft.

\* \* \* \* \*